W. J. GUNDERMAN.
ANTISKID DEVICE.
APPLICATION FILED JUNE 27, 1919.
1,400,358.
Patented Dec. 13, 1921.
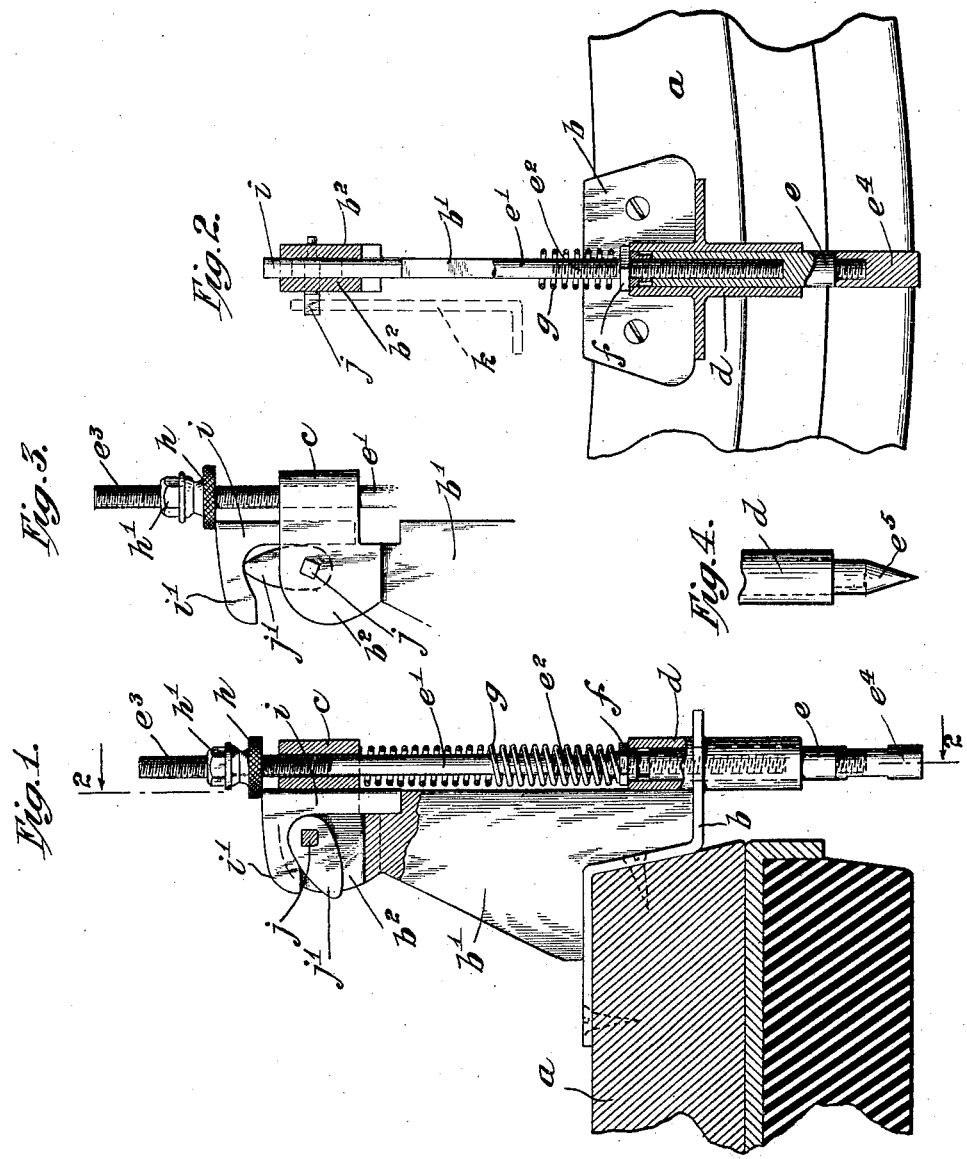
WITNESS
William J. Gunderman INVENTOR
BY Frank P. Wentworth
ATTORNEY.

UNITED STATES PATENT OFFICE.

WILLIAM J. GUNDERMAN, OF NEW YORK, N. Y.

ANTISKID DEVICE.

1,400,358. Specification of Letters Patent. Patented Dec. 13, 1921.

Application filed June 27, 1919. Serial No. 307,100.

*To all whom it may concern:*

Be it known that I, WILLIAM J. GUNDERMAN, a citizen of the United States, residing at the borough of Manhattan, in the city, county, and State of New York, have invented certain new and useful Improvements in Antiskid Devices, of which the following is a specification, reference being had therein to the accompanying drawings, which form a part thereof.

My invention relates to anti-skid devices, and more particularly to a device of this kind adapted to be permanently attached to the felly of the wheel, while being capable of being quickly brought into and out of the position where it is operative in relation to the road.

A device made in accordance with my invention is so constructed that the plunger, when the device is in use, will be brought into rolling contact with the road, and maintained in engagement therewith by heavy spring pressure acting axially of the plunger, the supporting means for this plunger being so constructed as to resist the transverse stresses upon the plunger.

Means are provided whereby the tension of this spring may be regulated to meet the needs of vehicles of different weights, and the operative end of the plunger is made detachable, so that contact points of different types may be substituted to meet different weather conditions.

In an anti-skid device made in accordance with my invention, the gripping plunger, as it is brought, by the rotation of the wheel, into a vertical position with relation to the road, will recede from the road against the tension of the spring acting thereon, the effectiveness of the grip during this interval being determined by the strength of the spring, which, as stated above, may be regulated to meet different requirements of the device.

Under normal working conditions the end of the plunger adjacent the road will be projected beyond the tread of the tire, means being provided whereby the extent of this projection may be regulated.

The invention consists primarily in an anti-skid device embodying therein a bracket adapted to be permanently connected with a wheel felly, upper and lower alined bearings thereon positioned at one side of the felly, a reciprocatory plunger mounted in said bearings, a spring seat carried by said plunger adjacent the lower of said bearings, a spring coiled about said plunger and acting against the upper of said bearings and said spring seat, whereby a directly vertical thrust is directed upon said plunger by said spring, and means limiting the extent of movement of said plunger by said spring; and in such other novel features of construction and combination of parts as are hereinafter set forth and described, and more particularly pointed out in the claims hereto appended.

Referring to the drawings,

Figure 1 is a side view of a device made in accordance with my invention, portions thereof being broken away;

Fig. 2 is a section on the line 2—2 of Fig. 1, showing in dotted lines the wrench by which the plunger may be raised out of its operative relation;

Fig. 3 is a detailed view of the plunger lifting mechanism, with the plunger in the raised position; and Fig. 4 is a view of a modified form of contact point.

Like letters refer to like parts throughout the several views.

In the embodiment of my invention shown in the drawings, I have indicated at $a$ a cross-sectional view of a wheel felly having a solid rubber tire thereon. Secured to this felly is a bracket $b$ having an angular portion adapted to conform to the felly and be secured thereto by means of screws, bolts, or in any other desired manner. This bracket has a vertically extending web $b'$ terminating in a forked head $b^2$.

Carried by the bracket $b$ are alined bearings $c$ and $d$, the upper of which is positioned adjacent the forked head $b^2$, and the lower of which, $d$, is elongated as shown, and positioned adjacent the lower end of the bracket $b$.

Mounted in the bearings $c$ and $d$ is a reciprocatory plunger $e$ having a reduced portion provided with screw threads $e^2$ adjacent the bearing $d$, and $e^3$ adjacent the upper end thereof, and a contact head $e^4$.

Adjustably mounted upon the reduced portion $e'$ of the plunger, by means of the screw threads $e^2$, is a nut $f$ which serves as a spring seat between which and the upper bearing $c$, a coiled spring $g$ is mounted, which spring encircles said reduced portion of the plunger.

By the construction described, I secure the advantage that the lower end of the plunger having movement in the bearing $d$ may be made of sufficient size and of hardened steel so as to withstand the ordinary stresses of use, the upper portion of the plunger and the bearing $c$ being subjected to little or no such stresses. By providing a coiled spring, the axis of which is coincident with that of the plunger, I avoid all likelihood of such side stresses from said spring upon the plunger as might result in such friction between it and the bearing $d$ as would interfere with the free movement of the plunger as it comes to a position vertical to the road. I am also enabled, by adjusting the nut $f$, to regulate the tension of this spring so as to determine the maximum force of contact between the contact head $e^4$ of the plunger and the road, when the plunger is in the vertical position.

In the accompanying drawings, I have shown the reduced portion of the plunger as being made of a separate rod connected with the enlarged portion thereof by means of screw threads, but it is apparent that this is a mere detail of construction, it being possible to provide screw threads for the entire length of this portion, so as to permit the mounting of the nut thereon. This, however, merely requires mechanical skill.

Carried by the screw threads $e^3$ is an adjustable shouldered nut $h$ coöperating with which is a lock nut $h'$, said nut $h$ being adapted, by engagement with the upper end of the slide $i$, to limit the extent of projection of the contact end of the plunger beyond the tread of the tire while it is in the operative position. By means of this nut the extent of such projection may also be regulated, the lock nut $h'$ being used to prevent the loss of adjustment as a result of vibration.

The slide $i$ is mounted between the arms of the forked head $b^2$ and in a vertically extending way formed in the web $b'$. Rotatably mounted between the arms of said forked head is a shaft $j$ having a cam $j'$ mounted thereon and rotatable therewith, said cam being adapted to operatively engage the recessed extension $i''$ of the slide $i$. The end of the shaft $j$ projects beyond the forked head $b^2$ and is adapted to receive a spanner or key wrench $k$ shown in dotted lines, Fig. 2, the use of which, or of some similar tool, being necessary by reason of the great tension of the spring $g$.

The contact end $e^4$ of the plunger $e$ is removable from said plunger by means of the coöperating screw studs and screw threads shown, with the two-fold object of permitting the substitution of a new contact end in the event of wear thereon, or permitting the removal of a contact end having a square surface which is adapted to be used in rainy weather or upon wet roads, and the substitution therefor of a pointed end $e^5$, like that shown in Fig. 4, for use upon icy roads.

The operation of the herein described device is substantially as follows:—

While the skidding of automobiles occurs with great suddenness, the driving wheels are always rotating unless skidding results from a strong application of brakes, which a skilful driver will avoid upon a slippery road. Hence it is unnecessary to have anti-skid devices throughout the entire periphery of a wheel, three or four of such devices ordinarily being sufficient to prevent the spinning of the wheel, and any tendency of the wheels to skid, if the brakes are properly handled. Any number of devices made in accordance with my invention may, however, be applied to a wheel, the contact plunger being arranged upon either side of the wheel, as may be desired, if suitable clearance is present.

The brackets $b$ are permanently and firmly connected to the felly of the wheel. Where the wheel has a wooden felly, ordinary screws may be used for this purpose, and where the felly is of metal, it is necessary to use bolts and to drill proper holes in the felly to receive same.

When each bracket $b$ has been properly positioned upon the wheel felly, the nuts $h$ and $h'$ are adjusted until the contact end $e^4$ or $e^5$ projects slightly beyond the tread of the tire, due allowance being made for the compression thereof under varying loads. When the plunger has been thus adjusted, to define the degree of projection of the contact end with relation to the felly, the nut $f$ is adjusted to secure the desired tension of the spring $g$.

When the parts have been thus properly adjusted, the cam $j'$ may be actuated to either raise the plunger $e$ to bring the contact end $e^4$ or $e^5$ above the plane of the road, so that as the driving wheels rotate, the contact head $e^4$ or $e^5$ will not engage the road at all, or when the road is bad, the cam $j'$ may be turned as shown in Fig. 1 of the drawings, to permit the spring $g$ to project the plunger $e$ to the maximum extent permitted by the nut $h$, and bring the contact end $e^4$ or $e^5$ beyond the tread of the tire so that the contact end of each device upon the wheel will engage the road with each rotation thereof.

As the wheel rotates, the contact end of the plunger will be brought into rolling contact with the road, the initial contact being at one edge of the end $e^4$, so as to take a sufficient bite on the road to check any tendency of the wheel to spin. As the plunger comes to the vertical position, the spring $g$ will yield, permitting movement of the plunger $e$, but maintaining frictional contact thereof with the road commensurate with the strength of the spring. As the end of the plunger rises with the continued rotation of the wheel, the spring will maintain this engagement until the extreme limit of movement of the plunger is reached.

While the plunger is in engagement with the road, slippage of the wheel, or skidding of the vehicle, is impossible, and by using a plurality of devices about the wheel, the interval during which there is no plunger operative upon the road, is so short as to prevent any likelihood of material slippage of the wheels or skidding of the vehicle.

The elongated bearing $d$ will absorb most of the stresses circumferentially of the wheel or axially thereof, thus relieving the upper portion of the plunger from these stresses.

By the construction described, the head $e^4$ and the enlarged adjacent portion of the plunger $e$ may be made sufficiently strong to withstand breaking or bending strains, which will be transmitted to the felly through the bracket $b$ and the connections between these parts.

By the use of the spring $g$ of the construction and in the relation shown, the free reciprocatory movement of the plunger $e$ under the load of the vehicle is assured, and the likelihood of a binding or disarrangement of parts is avoided. This is of considerable importance where a spring of high tension is to be used. Furthermore, this construction permits a quick and convenient adjustment of the tension of the spring and of the extent of projection of the plunger, and facilitates the actuation of the plunger to bring it into and out of the operative relation to the road.

When the roads are good, the cam $j'$ may be turned by means of the shaft $j$ and the wrench or key $k$ so as to raise the slide $i$, the engagement of which, in close proximity to the plunger $e$ with the nut $h$, will readily lift the plunger $e$ against the tension of the spring $g$. Since the device is readily accessible from the outside of the wheel, irrespective of the side thereof upon which it is mounted, this adjustment may be quickly secured.

The construction and manner of assembling the various parts is such that there will be no rattle in the device, the spring $g$ serving to prevent any looseness between the different parts.

With icy roads there might be a tendency of a plunger having a flat contact end such as $e^4$, to slip upon the ice, the removability of said head however, permitting the quick and convenient substitution of a head like that shown in Fig. 4, the spike upon which will effectively grip ice.

Since the extent of penetration of the contact head into the road need not be great, and since the extent of projection of this head may be controlled, there is little or no likelihood of material injury to a road as a result of the use of devices made in accordance with my invention.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An anti-skid device embodying therein a bracket adapted to be permanently connected with a wheel felly, upper and lower alined bearings thereon positioned at one side of the felly, a reciprocatory plunger mounted in said bearings, a spring seat carried by said plunger adjacent the lower of said bearings, a spring coiled about said plunger and acting against the upper of said bearings and said spring seat, whereby a directly vertical thrust is directed upon said plunger by said spring, a member adjustably mounted upon said plunger and adapted to engage one of said bearings, whereby the extent of movement of said plunger by said spring may be regulated, a slide mounted upon said bracket and adapted to be engaged by said member, and a cam rotatably mounted in said bracket and coöperating with said slide, whereby said plunger may be raised to, and maintained in, a position where it will not engage the road.

2. An anti-skid device embodying therein a bracket adapted to be permanently connected with a wheel felly, upper and lower alined bearings thereon positioned at one side of the felly, a reciprocatory plunger mounted in said bearings, said plunger having a contact end removable therefrom, whereby differently shaped ends may be used upon said plunger, a spring seat carried by said plunger adjacent the lower of said bearings, a spring coiled about said plunger and acting against the upper of said bearings and said spring seat, whereby a directly vertical thrust is directed upon said plunger by said spring, and means limiting the extent of movement of said plunger by said spring.

In witness whereof I have hereunto affixed my signature, in the presence of two subscribing witnesses, this 25th day of June, 1919.

WILLIAM J. GUNDERMAN.

Witnesses:
F. P. WENTWORTH,
FRIEDA KOEHLER.